United States Patent
Li

(10) Patent No.: US 11,641,360 B2
(45) Date of Patent: May 2, 2023

(54) ROLE-BASED ACCESS CONTROL WITH COMPLETE SETS OF GRANULAR ROLES

(71) Applicant: AT&T Intellectual Property I, L.P., Atlanta, GA (US)

(72) Inventor: Dongdong Li, Frisco, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 389 days.

(21) Appl. No.: 16/916,581

(22) Filed: Jun. 30, 2020

(65) Prior Publication Data

US 2021/0409417 A1   Dec. 30, 2021

(51) Int. Cl.
*H04L 9/40* (2022.01)
*G06F 21/60* (2013.01)
*H04L 67/1001* (2022.01)

(52) U.S. Cl.
CPC .......... *H04L 63/104* (2013.01); *G06F 21/604* (2013.01); *H04L 63/102* (2013.01); *H04L 63/105* (2013.01); *H04L 67/1001* (2022.05)

(58) Field of Classification Search
CPC ... H04L 63/104; H04L 63/102; H04L 63/105; H04L 67/1001; G06F 21/604; G06F 2221/2111
See application file for complete search history.

(56) References Cited

U.S. PATENT DOCUMENTS

| 7,219,234 B1* | 5/2007 | Ashland | G06F 21/604 726/16 |
| 8,117,643 B2* | 2/2012 | Vidya | G06F 21/6218 726/4 |
| 8,402,514 B1* | 3/2013 | Thompson | H04L 63/08 726/4 |
| 10,084,792 B2* | 9/2018 | Levit | G06Q 10/06 |
| 11,178,154 B1* | 11/2021 | Balber | H04L 63/105 713/166 |
| 2002/0026592 A1* | 2/2002 | Gavrila | G06F 21/6218 709/229 |

(Continued)

OTHER PUBLICATIONS

Xu, Dianxiang, et al. "Automated model-based testing of role-based access control using predicate/transition nets." IEEE Transactions on Computers 64.9 (2014): 2490-2505. (Year: 2014).*

*Primary Examiner* — Jung W Kim
*Assistant Examiner* — Sameera Wickramasuriya
(74) *Attorney, Agent, or Firm* — Hartman & Citrin LLC

(57) ABSTRACT

According to one aspect of the concepts and technologies disclosed herein, a role-based access control ("RBAC") system can mark all granular roles in a granular role group as non-tested to create a non-tested granular role set. The RBAC system can randomly select a granular role from the non-tested granular role set. The RBAC system can assign both the non-tested granular role set and a tested-keep granular role set to the granular role group. Each granular role in the tested-keep granular role set has been tested an approved for inclusion in the complete granular role set. The RBAC system can determine whether a user assigned to the granular role group has access to a protected function. In response to determining that the user does not have access to the protected function, the RBAC system can mark the granular role for inclusion in the tested-keep granular role set.

20 Claims, 9 Drawing Sheets

(56) References Cited

U.S. PATENT DOCUMENTS

| | | | | |
|---|---|---|---|---|
| 2003/0088786 | A1* | 5/2003 | Moran | H04L 63/102 |
| | | | | 726/4 |
| 2004/0093526 | A1* | 5/2004 | Hirsch | H04L 63/105 |
| | | | | 726/21 |
| 2006/0090208 | A1* | 4/2006 | Smith | H04L 63/105 |
| | | | | 713/166 |
| 2008/0120302 | A1* | 5/2008 | Thompson | G06F 21/6209 |
| | | | | 707/999.009 |
| 2008/0256606 | A1* | 10/2008 | Koikara | G06F 21/604 |
| | | | | 726/4 |
| 2008/0271122 | A1* | 10/2008 | Nolan | H04L 63/102 |
| | | | | 726/4 |
| 2014/0082689 | A1* | 3/2014 | Christiaens | G06F 21/604 |
| | | | | 726/1 |
| 2019/0230088 | A1* | 7/2019 | Rice | G06F 21/604 |
| 2020/0358778 | A1* | 11/2020 | Gopinathapai | G06F 21/6218 |
| | | | | 726/4 |
| 2021/0226956 | A1* | 7/2021 | Wei | H04L 63/105 |
| | | | | 726/21 |

* cited by examiner

ROLE-BASED ACCESS CONTROL WITH COMPLETE SETS OF GRANULAR ROLES

BACKGROUND

Access control is a fundamental element of any data security infrastructure. Attribute-based access control ("ABAC") and role-based access control ("RBAC") are popular methods for access control. ABAC provides access rights to data based on user, environment, and/or resource attributes. RBAC provides access rights to data based on user roles. ABAC is more difficult to implement, although ABAC is capable of providing more granular access control than current RBAC systems. RBAC systems have been refined over time and today many companies use RBAC due to easier deployment than ABAC alternatives.

Current RBAC systems can define custom granular role groups that are adaptable to the various roles that may be encountered in various deployment scenarios, including deployments in cloud infrastructure. A granular-role based RBAC system allows users to create new granular role groups using low-level granular roles. Granular roles can be grouped into granular role groups to satisfy user needs. When assigning granular roles to users, the RBAC system should ensure a complete set of roles to satisfy user needs. On one hand, if more granular roles are assigned to a granular role group than the users of that group need, a security breach opportunity may be created. On the other hand, if less granular roles are assigned to the granular role group, users may not be able to accomplish their job due to access restrictions. Standard roles can be decoupled into multiple granular roles. In some instances, the granular roles may be on the order of a hundred or more. This presents a challenge with regard to how granular roles should be assigned to ensure correct granular role groups assignments and also limiting the potential for security breaches.

SUMMARY

An improved RBAC system is described herein. The improved RBAC system granular role assignment system implements a granular role assignment algorithm to automatically assign granular roles to granular role groups. This ensures that the granular roles assigned to a granular role group are sufficient to allow a user in the granular role group to do their job. This also ensures that extra granular roles are not added to a granular role group to cause a security breach.

The granular role assignment algorithm can use a trial and error process to obtain a complete set of granular role assignments for a given granular role group. The granular role assignment algorithm can assign all granular roles to a granular role group, randomly select one of the granular roles, and remove that granular role from the granular role group. If a user who is assigned to the granular role group is still able to access one or more cloud functions needed to perform their job, then the granular role can be considered redundant and can be removed from the granular role group. If the user cannot access cloud functions, then the granular role can be considered essential for the user to be able to access the cloud function(s) needed to perform their job and can be kept in the granular role group. The granular role assignment algorithm then selects another granular role that has not been tested, and the above operations are repeated for this granular role. The granular role assignment algorithm continues with each granular role until all granular roles have been tested. After all granular roles have been tested, the resultant set of granular roles remaining in the granular role group is determined to be the complete set of granular roles for the granular role group. Each granular role in the complete set of granular roles is not redundant and is considered to be essential for users assigned to the granular role group to access the cloud function(s).

According to one aspect of the concepts and technologies disclosed herein, an RBAC system can include a processor and memory. The memory can store instructions that, when executed by the processor, cause the processor to perform operations. In particular, the RBAC can mark all granular roles in a granular role group as non-tested to create a non-tested granular role set. Each granular role in the non-tested granular role set has not been tested for inclusion in a complete granular role set. The RBAC system can randomly select a granular role from the non-tested granular role set. The RBAC system can assign both the non-tested granular role set and a tested-keep granular role set to the granular role group. Each granular role in the tested-keep granular role set has been tested and approved for inclusion in the complete granular role set. The RBAC system can determine whether a user assigned to the granular role group has access to a protected function. In response to determining that the user does not have access to the protected function, the RBAC system can mark the granular role for inclusion in the tested-keep granular role set. In response to determining that the user does have access to the protected function, the RBAC system can mark the granular role for inclusion in a tested-removed granular role set. Each granular role in the tested-removed granular role set has been tested and denied for inclusion in the complete granular role set. The RBAC system can determine whether the non-tested granular role set includes at least one additional granular role. In response to determining that the non-tested granular role set includes at least one additional granular role, the RBAC system can randomly select a further granular role from the non-tested granular role set. The RBAC system can assign both the non-tested granular role set and the tested-keep granular role set to the granular role group. The RBAC system can determine whether the user assigned to the granular role group has access to the protected function. In response to determining that the user does not have access to the protected function, the RBAC system can mark the further granular role for inclusion in the tested-keep granular role set. In response to determining that the user does have access to the protected function, the RBAC system can mark the further granular role for inclusion in the tested-removed granular role set. The RBAC can determine whether the non-tested granular role set includes at least one additional granular role. In response to determining that the non-tested granular role set does not include any additional granular roles, the RBAC system can output the complete granular role set that includes the tested-keep granular role set.

In some embodiments, the protected function includes a cloud function provided by a cloud network. The cloud network can include a plurality of cloud resources, such as, for example, compute, network, storage, credentials, repositories, and other cloud resources. The cloud function can include a create function, a delete function, an update function, or a view function for interacting with at least a portion of the cloud resources.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
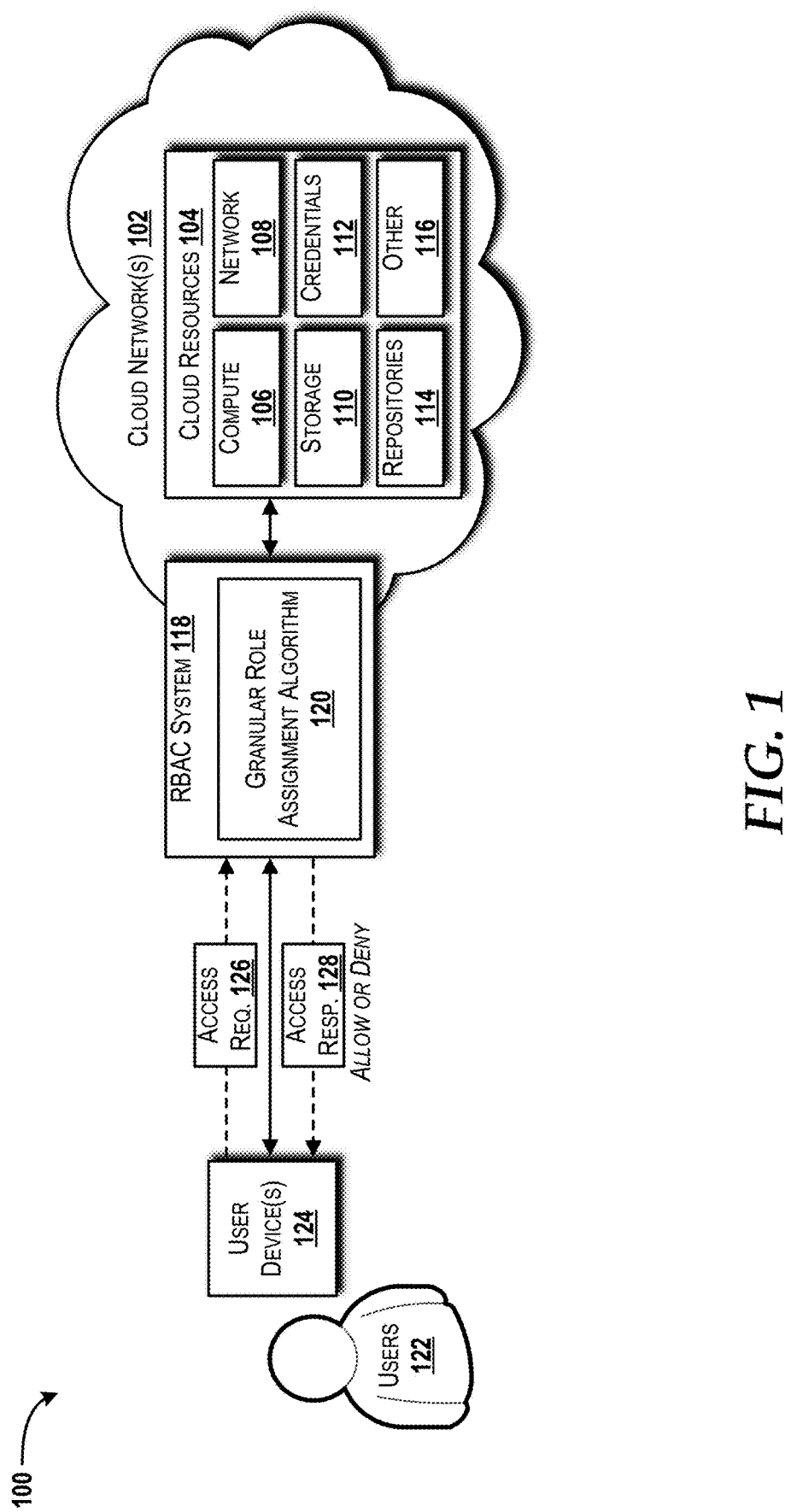
FIG. 1 is a block diagram illustrating an illustrative operating environment in which various embodiments of the concepts and technologies described herein can be implemented.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of the concepts and technologies disclosed herein for will be described.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 includes one or more cloud networks 102 (hereinafter referred to generically or collectively as cloud networks 102 or individually as cloud network 102). For ease of explanation, a single cloud network 102 will be described. The cloud network 102 includes a plurality of cloud resources ("cloud resources") 104, some examples of which can include, but are not limited to, compute resources 106, network resources 108, storage resources 110, credentials 112, repositories 114, and other resources 116. The compute resources 106 should be interpreted as generic compute resources that can be implemented using various cloud compute technologies. For example, the compute resources 106 may be implemented using Nova as one or more virtual machines in OPENSTACK (available from OpenStack Foundation), one or more containers or pods in KUBERNATES (available from The Linux Foundation), one or more containers in DOCKER (available from DOCKER, INC.), and the like. Similarly, the network resources 108 should be interpreted as generic network resources that can be implemented using various cloud networking technologies. For example, the network resources 108 may be implemented in Neutron in OPENSTACK, Calico and/or other network plug-ins in KUBERNATES, DOCKER network in DOCKER, and the like. Likewise, the storage resources 110, credentials 112, repositories 114, and other resources 116 should be interpreted as generic with specific implementations available in different cloud infrastructures, such as OPENSTACK, KUBERNATES, and DOCKER mentioned above and other cloud infrastructures not specifically described herein. As such, the cloud network 102 and the cloud resources 104 should not be construed as being limited to any particular cloud technologies. Moreover, those skilled in the art will appreciate that the cloud resources 104 may be implemented using proprietary technologies, open source technologies, or some combination thereof.

Example cloud architectures upon which the cloud network 102 can be based are described in detail below. The cloud network 102 can be configured in accordance with a virtualized cloud architecture 800, such as described herein with reference to FIG. 8. The cloud network 102 can be configured in accordance with a containerized cloud architecture 900, such as described herein with reference to FIG. 9. Hybrid cloud networks that support virtualization and containerization technologies are also contemplated. These architectures should not be construed as being limiting in any way.

Figure 2:
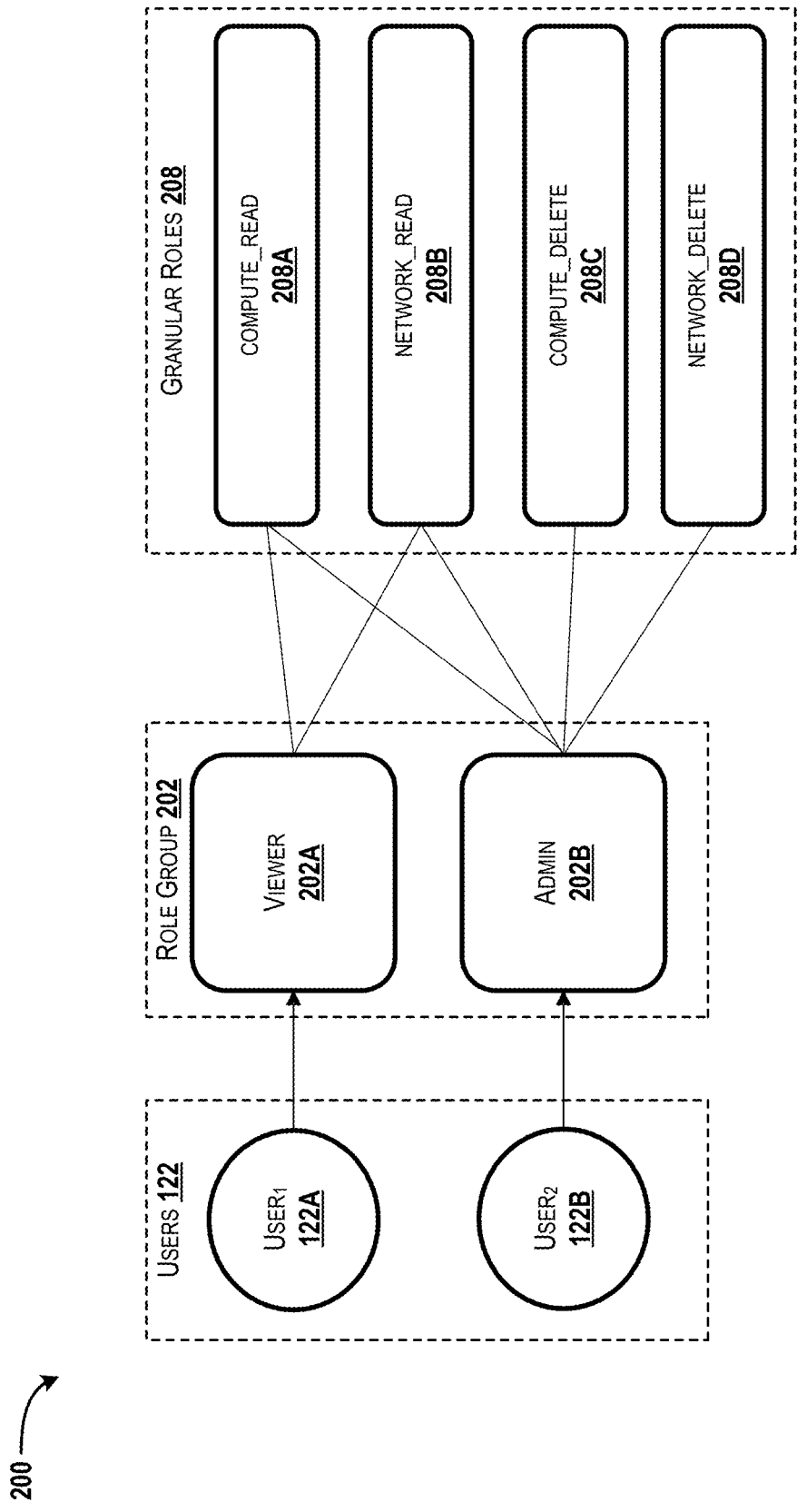
FIG. 2 is a block diagram illustrating an RBAC role architecture, according to an illustrative embodiment.

Access to the cloud network 102, and particularly the cloud resources 104 and functions thereof, can be controlled via an improved RBAC system ("RBAC system") 118. The RBAC system 118 can implement a granular role assignment algorithm 120 to assign granular roles to one or more granular role groups to which one or more users 122 can be assigned. Turning briefly to FIG. 2, a block diagram illustrating an RBAC role architecture 200 will be described, according to an illustrative embodiment. The illustrated RBAC role architecture 200 includes a first user (shown as "user$_1$") 122A and a second user (shown as "user$_2$") 122B. Both users 122A/122B are assigned to a granular role group 202. In particular, the first user 122A is assigned to a viewer granular role group 202A, and the second user 122B is assigned to an administrator granular role group 202B. Each of the granular role groups 202 can be assigned one or more granular roles 208, such as, in the illustrated embodiment, a compute_read granular role 208A, a network_read granular role 208B, a compute_delete granular role 208C, and a network_delete granular role 208D. The RBAC role architecture 200 can support any number of users 122, granular role groups 202, and granular roles 208. As such, the illustrated example should not be construed as being limiting in any way.

Current RBAC systems are manually programmed to assign granular roles to granular role groups. These RBAC systems are easy to setup for a small set of granular roles (e.g., less than 100 granular roles). These RBAC systems are prone to mistakes, such as more granular roles being assigned to users than are needed, which can result in security breaches. The improved RBAC system 118 disclosed herein can automatically assign the granular roles 208 to the users 122 by finding a complete set of the granular roles 208 mapped to the granular role groups 202. The RBAC system 118 provides several advantages over the current RBAC systems. The RBAC system 118 can assign the granular roles 208 to the users 122 such that the complete set of the granular roles 208 does not include additional granular roles 208 than is necessary to protect the asset(s) (e.g., the cloud network 102 and the cloud resources 104 and functions thereof) to which the RBAC system 118 restricts access. In addition, the RBAC system 118 assigns the appropriate number of granular roles 208 to the users 122 so that the users 122 can effectively perform their job(s) without being unnecessarily restricted by the granular roles 208, while simultaneously avoiding security breaches due, at least in part, to too few of granular roles 208 being assigned.

Returning to FIG. 1, each of the users 122 can be associated with one or more user devices 124 (hereinafter referred to collectively or generically as "user devices 124" or individually as "user device 124"). The user devices 124 can be or can include computers, servers, mobile device (e.g., smartphone or tablet), other computing devices, combinations thereof, and the like. The user device 124 can be configured similar to or the same as an example computer system 400 that is described herein with reference to FIG. 4. The user device 124 can be configured similar to or the same as an example mobile device 500 that is described herein with reference to FIG. 5. In general, the user device 124 can be or can include any device that is capable of communicating with the RBAC system 118 to access the cloud network 102.

The user device 124 can generate an access request 126. The access request 126 can identify one or more endpoint uniform resource locators ("URLs") associated with one or more of the cloud resources 104, and can specify one or more functions that the user 122 desires to access. For example, the access request 126 may specify a create function, a delete function, an update function, and/or a view function to be performed on one or more of the cloud resources 104. Those skilled in the art will appreciate that additional and/or alternative functions may be specified in the access request 126 depending upon the capabilities provided by the cloud network 102.

The RBAC system 118 can receive the access request 126 and can determine whether the user 122 associated with the access request 126 is assigned to one of the granular role groups 202 that includes the granular role(s) 208 corresponding to the requested function(s). If so, the RBAC system 118 can generate an access response 128 that indicates the user 122 is allowed access to the requested function(s). The requested function(s) can be performed and the access response 128 can provide confirmation to this effect. If the user 122 is not associated with the access request 126, the access response 128 can indicate that the user 122 is denied access to the requested function(s).

Before the RBAC system 118 can accept or deny the access request 126, the RBAC system 118 finds a complete set of the granular roles 208 to be assigned to the granular role group(s) 202. A high-level process to find the complete set of the granular roles 208 will now be described. The granular role assignment algorithm 120 receives a number of inputs that specify the cloud function(s) to be protected and a candidate set of the granular roles 208 that need to be assigned to at least one of the granular role groups 202. The granular role assignment algorithm 120 then conducts a trial-and-error process to assign the granular roles 208. Initially, the granular role assignment algorithm 120 assigns all of the granular roles 208 that are available to the granular role group 202. The user(s) 122 assigned to the granular role group 202 should be able to access all protected cloud functions. The granular role assignment algorithm 120 then removes one of the granular roles 208 at a time and permits the user 122 access to the protected cloud functions again. If the user 122 is still able to access the protected cloud functions, the removed granular role is considered to be redundant and is removed from the granular role group 202. If the user 122 cannot access the protected cloud functions, the removed granular role is considered to be essential and is kept in the granular role group 202. The process repeats for another one of the granular roles 208 until all granular roles are processed. The granular role assignment algorithm 120 then outputs the granular roles 208 that remain in the granular role group 202. These granular roles 208 are considered to be the complete set of the granular roles 208 for the granular role group 202. The complete set of the granular roles 208 includes only granular roles that are not redundant and considered to be essential to access the cloud functions. Additional details about an implementation of the granular role assignment algorithm 120 will now be described with reference to FIG. 3.

Figure 3:
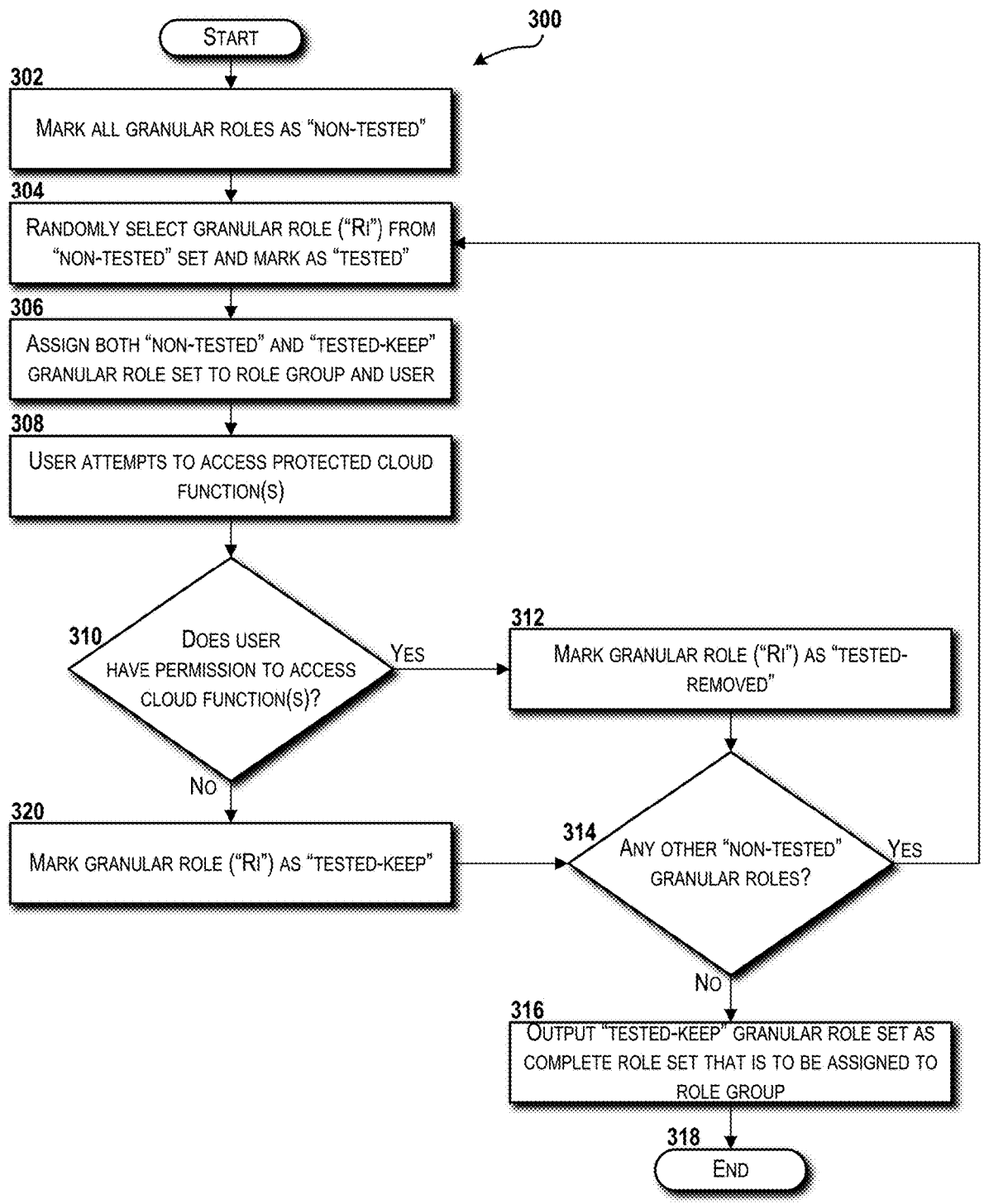
FIG. 3 is a flow diagram illustrating a method for implementing a granular role assignment algorithm to determine a complete granular role set to be assigned to a granular role group, according to an illustrative embodiment.

Turning now to FIG. 3, a method 300 for implementing the granular role assignment algorithm 120 to determine a complete set of the granular roles 208 to be assigned to a given granular role group 208 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors, or components thereof, and/or one or more other computing systems, network components, and/or devices disclosed herein, and/or virtualizations thereof, to perform operations.

For purposes of illustrating and describing some of the concepts of the present disclosure, the methods will be described as being performed, at least in part, by the RBAC system 118 via execution of the granular role assignment algorithm 120 by one or more processing components. It should be understood that additional and/or alternative devices can provide the functionality described herein via execution of one or more modules, applications, and/or other software. Thus, the illustrated embodiments are illustrative, and should not be viewed as being limiting in any way.

The method 300 will be described from the perspective of the RBAC system 118 via execution of the granular role assignment algorithm 120. In addition, the method 300 will be described in the context of creating a complete set of the granular roles 208 for one granular role group 202. It should be understood that the method 300 can be executed for one granular role group 202 at a time or multiple granular role groups 202 simultaneously.

The method 300 begins and proceeds to operation 302. At operation 302, the RBAC system 118 marks all of the granular roles 208 as "non-tested." The "non-tested" set of the granular roles 208 includes all of the granular roles 208 that have not been tested for inclusion in a complete set of the granular roles 208 for a particular granular role group 202.

From operation 302, the method 300 proceeds to operation 304. At operation 304, the RBAC system 118 randomly selects one granular role ("$R_i$") 208 from the "non-tested" set and marks the selected granular role 208 as "tested." The "tested" set of granular roles includes all granular roles that have been tested for inclusion in a complete set of granular roles for a particular granular role group. The "tested" set can include a "tested-keep" subset and a "tested-removed" subset. The "tested-keep" subset can include any granular role that has been tested and determined to be included in the complete set of granular roles. The "tested-removed" subset can include any granular role that has been tested and determined to be removed from the complete set of granular roles.

From operation 304, the method 300 proceeds to operation 306. At operation 306, the RBAC system 118 assigns both the "non-tested" set and "tested-keep" subset to the granular role group and the user. From operation 306, the method 300 proceeds to operation 308. At operation 308, the user attempts to access one or more protected cloud functions. From operation 308, the method 300 proceeds to operation 310. At operation 310, the RBAC system 118 determines if the user has permission to access the cloud function(s). If the RBAC system 118 determines that the user has permission to access the cloud function(s), the method 300 proceeds to operation 312. At operation 312, the RBAC system 118 marks the granular role ("R") as "tested-removed." In other words, with the selected granular role removed, the RBAC system 118 still provides the user access to the cloud function(s), and for this reason, the selected granular role should be removed from the complete role set.

From operation 312, the method 300 proceeds to operation 314. At operation 314, the RBAC system 118 determines if any other "non-tested" granular roles exist. If so, the method 300 returns to operation 304, and the method 300 proceeds as described above. If not, the method 300 proceeds to operation 316. At operation 316, the RBAC system 118 outputs the "tested-keep" granular role set as a complete role set that is to be assigned to the granular role group.

From operation 316, the method 300 proceeds to operation 318. At operation 318, the method 300 can end.

Returning to operation 310, if the RBAC system 118 determines that the user does not have permission to access the cloud function(s), the method 300 proceeds to operation 320. At operation 320, the RBAC system 118 marks the granular role as "tested-keep." From operation 320, the method 300 proceeds to operation 314, and the method 300 proceeds as described above.

An illustrative example of an implementation of the granular role assignment algorithm 120 executed by the RBAC system 118 will now be described. This example utilizes the compute_read granular role 208A, network_read granular role 208B, compute_delete granular role 208C, and network_delete granular role 208D of the granular roles 208 that were introduced above with respect to FIG. 2. Those skilled in the art will appreciate that real world implementations of the granular role assignment algorithm 120 will likely include far greater numbers of granular roles 208 on the order of thousands, tens of thousands, or even millions, for example. As such, the four example granular roles 208 are used for ease of explanation and should not be construed as being limiting in any way.

The granular role assignment algorithm 120 begins by marking all of the granular roles 208 as "non-tested." The resultant set of non-tested roles can be defined as "non-tested" set=[compute_read, network_read, compute_delete, network_delete]. A "tested-removed" set can be initially defined as a null set [ ] because none of the granular roles 208 have been tested and removed. A "tested-keep" set also can be initially defined as a null set [ ] because none of the granular roles 208 have been tested and kept.

After the "non-tested," "tested-removed," and "tested-keep" sets have been initialized, the granular role assignment algorithm 120 begins a first iteration. The granular role assignment algorithm 120 randomly selects one granular role 208 from the "non-tested" set. For this example, the compute_delete granular role 208C will be selected and removed from the "non-tested" set. The resultant "non-tested" set can be defined as "non-tested" set=[compute_read, network_read, network_delete]. The granular role assignment algorithm 120 then assigns both the "non-tested" set and "tested-keep" role sets to the granular role group 206 of a target user or group of users 122 (hereinafter a single user 122). The user 122 can be allowed to attempt access to the cloud function(s) needed to carry out their job. For example, the user 122 can attempt to access a given endpoint URL (e.g., "nova.ab.com" as a fake dynamic name service name that points to an OPENSTACK Nova API endpoint) The user 122 should have permission to access the endpoint URL and get a list of virtual machines. The granular role assignment algorithm 120 can then mark the compute_delete granular role 208C as "tested-removed." The "tested-removed" role set then becomes "tested-removed" set=[compute_delete].

The granular role assignment algorithm 120 then begins a second iteration. The granular role assignment algorithm 120 randomly selects another granular role 208 from the "non-tested" set. For this example, the compute_read granular role 208A will be selected and removed from the "non-tested" set. The resultant "non-tested" set can be defined as "non-tested" set=[network_read, network_delete]. The granular role assignment algorithm 120 then assigns both the "non-tested" set and "tested-keep" role sets to the granular role group 206 of the user 122. The user 122 can be allowed to attempt access to the cloud function(s) needed to carry out their job. For example, the user 122 can attempt to access the endpoint URL. The user 122 should be denied access to the endpoint URL. The granular role assignment algorithm 120 can then mark the compute_read granular role 208C as "tested-keep." The "tested-keep" role set then becomes "tested-keep" set=[compute_read].

The granular role assignment algorithm 120 begins a third iteration. The granular role assignment algorithm 120 randomly selects another granular role 208 from the "non-tested" set. For this example, the network_delete granular role 208D will be selected and removed from the "non-tested" set. The resultant "non-tested" set can be defined as "non-tested" set=[network_read]. The granular role assignment algorithm 120 then assigns both the "non-tested" set and "tested-keep" role sets to the granular role group 206 of a target user or group of users 122 (hereinafter a single user 122). The user 122 can be allowed to attempt access to the cloud function(s) needed to carry out their job. For example, the user 122 can attempt to access the endpoint URL. The user 122 should have permission to access the endpoint URL and get a list of virtual machines. The granular role assignment algorithm 120 can then mark the network_delete granular role 208D as "tested-removed." The "tested-removed" role set then becomes "tested-removed" set=[compute_delete, network_delete].

The granular role assignment algorithm 120 begins a fourth iteration. The granular role assignment algorithm 120 randomly selects another granular role 208 from the "non-tested" set. For this example, the network_read granular role 208B will be selected and removed from the "non-tested" set. The resultant "non-tested" set can be defined as "non-tested" set=[ ]. The granular role assignment algorithm 120 then assigns both the "non-tested" set and "tested-keep" role sets to the granular role group 206 of a target user or group of users 122 (hereinafter a single user 122). The user 122 should be denied to access to the cloud function(s). The granular role assignment algorithm 120 can then mark the network_read granular role 208B as "tested-keep." The "tested-keep" role set then becomes "tested-keep" set=[compute_read, network_read].

The granular role assignment algorithm 120 then begins a fifth iteration. The "non-tested" set is now empty. The search ends and the "tested-keep" set is marked as the complete role set.

Figure 4:
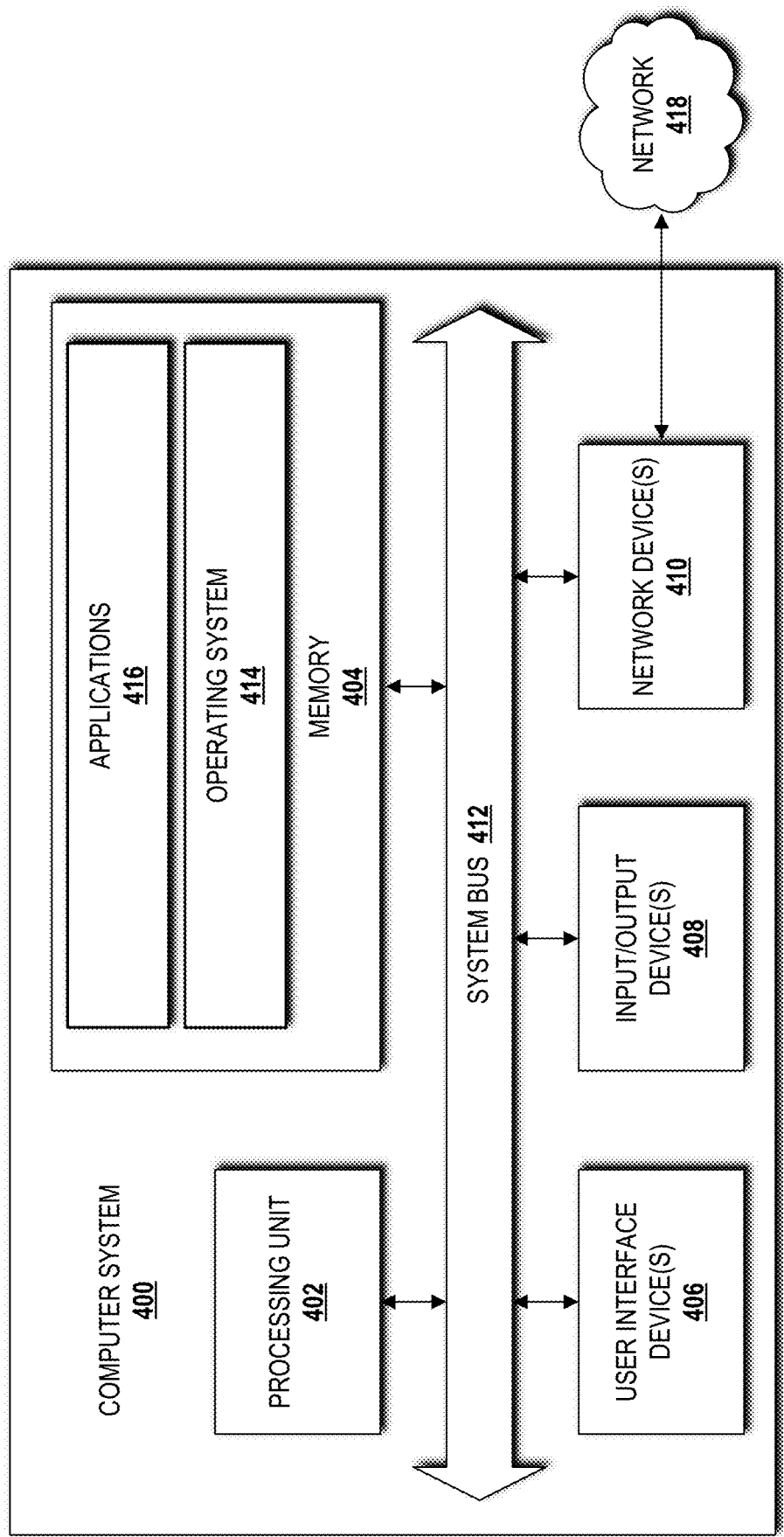
FIG. 4 is a block diagram illustrating an example computer system capable of implementing aspects of the embodiments presented herein.

Turning now to FIG. 4, a computer system 400 and components thereof will be described. An architecture similar to or the same as the computer system 400 can be used to implement various systems and/or devices disclosed herein, such as the RBAC system 118 and/or the user device(s) 124. The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410.

The processing unit 402 might be a standard central processor that performs arithmetic and logical operations, a more specific purpose programmable logic controller ("PLC"), a programmable gate array, or other type of processor known to those skilled in the art and suitable for controlling the operation of the computer system 400. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more applications 416. The operating system 414 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 406 may include one or more devices with which a user accesses the computer system 400. The user interface devices 406 may include, but are not limited to, computers, servers, personal digital assistants, telephones (e.g., cellular, IP, or landline), or any suitable computing devices. The I/O devices 408 enable a user to interface with the program modules. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, a touchscreen, or an electronic stylus. Further, the I/O devices 408 may include one or more output devices, such as, but not limited to, a display screen or a printer. An I/O device 408 embodied as a display screen can be used to present information.

The network devices 410 enable the computer system 400 to communicate with a network 418. Examples of the network devices 410 include, but are not limited to, a modem, a radio frequency ("RF") or infrared ("IR") transceiver, a telephonic interface, a bridge, a router, or a network card. The network 418 may include a wireless network such as, but not limited to, a WLAN such as a WI-FI network, a WWAN, a wireless PAN ("WPAN") such as BLUETOOTH, or a wireless MAN ("WMAN"). Alternatively, the network 418 may be a wired network such as, but not limited to, a WAN such as the Internet, a LAN such as the Ethernet, a wired PAN, or a wired MAN.

Figure 5:
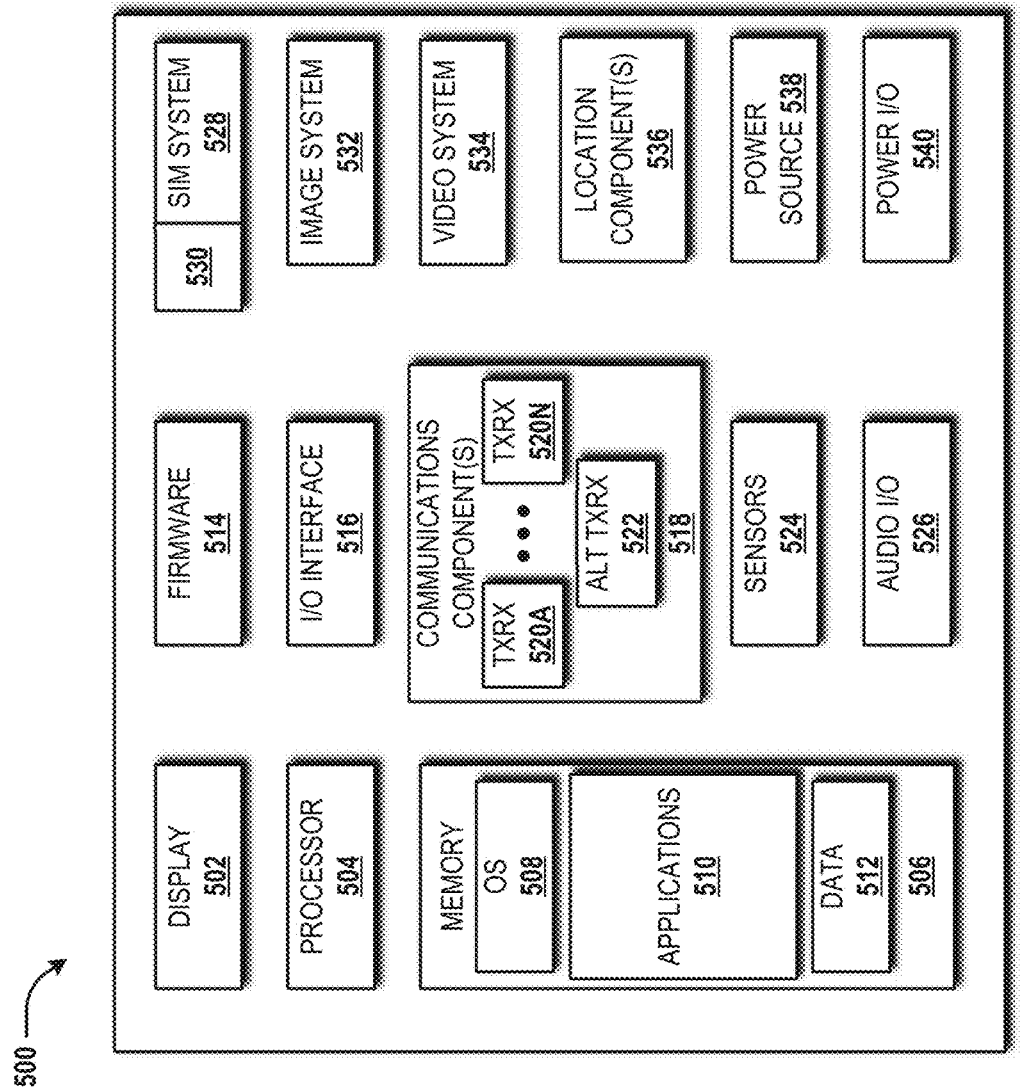
FIG. 5 is a block diagram illustrating an example mobile device capable of implementing aspects of the embodiments disclosed herein.

Turning now to FIG. 5, an illustrative mobile device 500 and components thereof will be described. In some embodiments, the user device(s) 124 is/are configured similar to or the same as the mobile device 500.

While connections are not shown between the various components illustrated in FIG. 5, it should be understood that some, none, or all of the components illustrated in FIG. 5 can be configured to interact with one another to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in the memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering/deleting data, entering and setting user IDs and passwords for device access, configuring settings, manipulating content and/or settings, multimode interaction, interacting with other applications 510, and otherwise facilitating user interaction with the operating system 508, the applications 510, and/or other types or instances of data 512 that can be stored at the mobile device 500.

The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, presence status information, user IDs, passwords, and application initiation (start-up) requests. In some embodiments, the I/O interface 516 can include a hardwire connection such as a universal serial bus ("USB") port, a mini-USB port, a micro-USB port, an audio jack, a PS2 port, an IEEE 1354 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks, such as the cloud network 102, the Internet, or some combination thereof. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments, one or more of the transceivers of the communications component 518 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 518 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted-GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 500 or other devices or computers described herein, such as the computer system 400 described above with reference to FIG. 4. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 500 in order to store and execute the software components presented herein. It is also contemplated that the mobile device 500 may not include all of the components shown in FIG. 5, may include other components that are not explicitly shown in FIG. 5, or may utilize an architecture completely different than that shown in FIG. 5.

Figure 6:
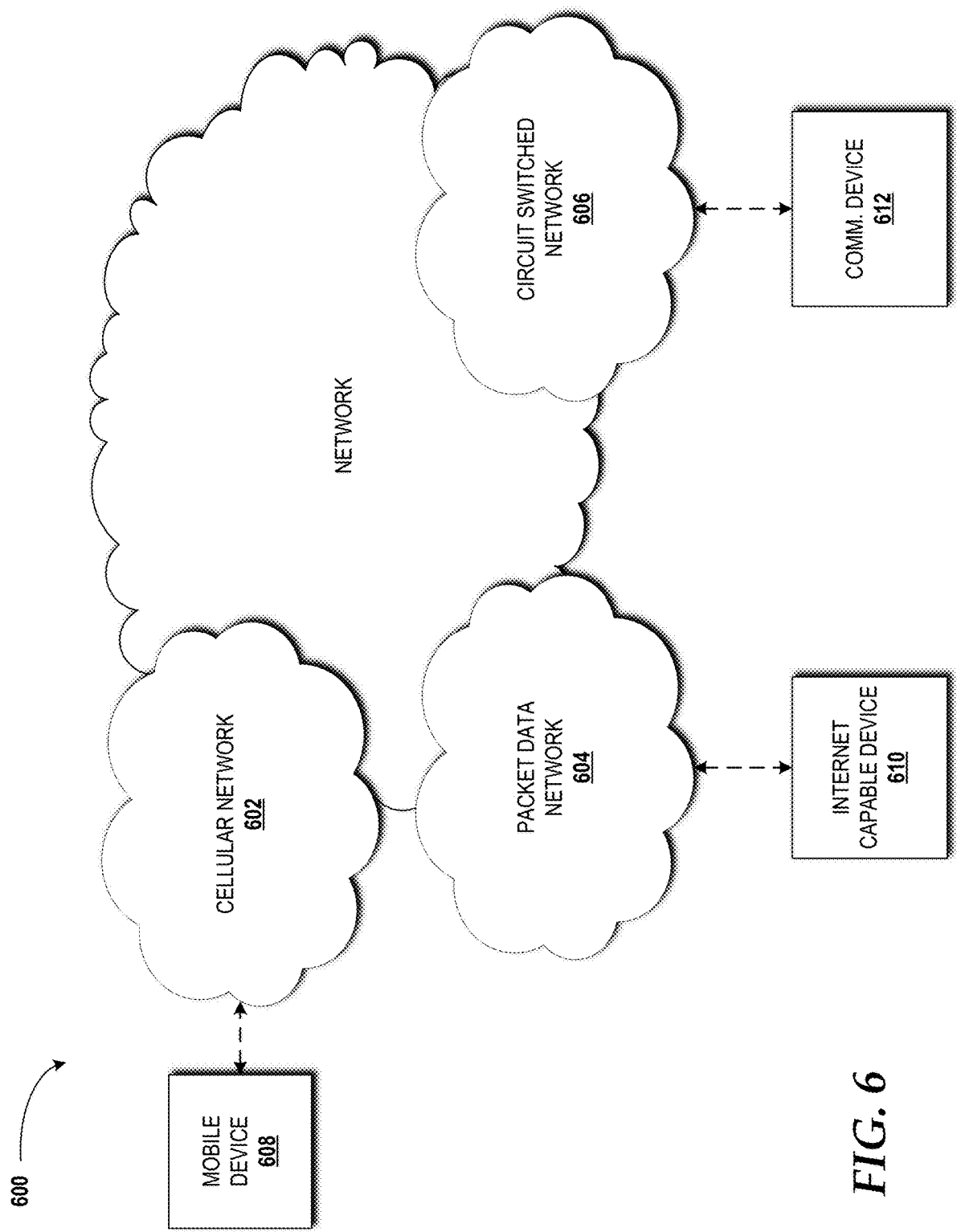
FIG. 6 is a diagram illustrating a network, according to an illustrative embodiment.

Turning now to FIG. 6, details of a network 600 are illustrated, according to an illustrative embodiment. The network 600 includes a cellular network 602, a packet data network 604, and a circuit switched network 606 (e.g., a public switched telephone network). The cellular network 602 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, the user device(s) 124, a cellular telephone, a user equipment, a mobile terminal, a PDA, a laptop computer, a handheld computer, and combinations thereof, can be operatively connected to the cellular network 602. The mobile communications device 608 can be configured similar to or the same as the mobile device 500 described above with reference to FIG. 5.

The cellular network 602 can be configured as a GSM) network and can provide data communications via GPRS and/or EDGE. Additionally, or alternatively, the cellular network 602 can be configured as a 3G Universal Mobile Telecommunications System ("UMTS") network and can provide data communications via the HSPA protocol family, for example, HSDPA, EUL, and HSPA+. The cellular network 602 also is compatible with 4G mobile communications standards such as LTE, or the like, as well as evolved and future mobile standards.

The packet data network 604 includes various systems, devices, servers, computers, databases, and other devices in communication with one another, as is generally known. In some embodiments, the packet data network 604 is or includes one or more WI-FI networks, each of which can include one or more WI-FI access points, routers, switches, and other WI-FI network components. The packet data network 604 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610 such as the user device(s) 124, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610.

Figure 7:
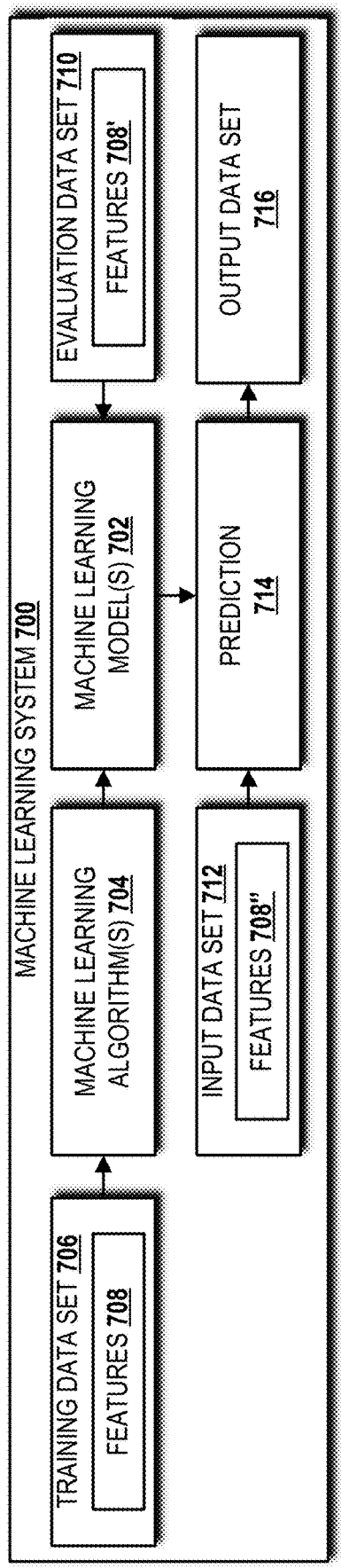
FIG. 7 is a diagram illustrating a machine learning system, according to an illustrative embodiment.

Turning now to FIG. 7, a machine learning system 700 capable of implementing aspects of the embodiments disclosed herein will be described. In some embodiments, the RBAC system 118 can utilize the machine learning system 700 to implement the granular role assignment algorithm 120. The RBAC system 118 may include the machine learning system 700 or may communicate with the machine learning system 700 that is operating remotely from the RBAC system 118.

The illustrated machine learning system 700 includes one or more machine learning models 702. The machine learning models 702 can include supervised and/or semi-supervised learning models. The machine learning model(s) 702 can be created by the machine learning system 700 based upon one or more machine learning algorithms 704. The machine learning algorithm(s) 704 can be any existing, well-known algorithm, any proprietary algorithms, or any future machine learning algorithm. Some example machine learning algorithms 704 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 704 based upon the problem(s) to be solved by machine learning via the machine learning system 700.

The machine learning system 700 can control the creation of the machine learning models 702 via one or more training parameters. In some embodiments, the training parameters are selected modelers at the direction of an enterprise, for example. Alternatively, in some embodiments, the training parameters are automatically selected based upon data provided in one or more training data sets 706. The training parameters can include, for example, a learning rate, a model size, a number of training passes, data shuffling, regularization, and/or other training parameters known to those skilled in the art. The training data in the training data sets 706.

The learning rate is a training parameter defined by a constant value. The learning rate affects the speed at which the machine learning algorithm 704 converges to the optimal weights. The machine learning algorithm 704 can update the weights for every data example included in the training data set 706. The size of an update is controlled by the learning rate. A learning rate that is too high might prevent the machine learning algorithm 704 from converging to the optimal weights. A learning rate that is too low might result in the machine learning algorithm 704 requiring multiple training passes to converge to the optimal weights.

The model size is regulated by the number of input features ("features") 708 in the training data set 706. A greater the number of features 708 yields a greater number of possible patterns that can be determined from the training data set 706. The model size should be selected to balance the resources (e.g., compute, memory, storage, etc.) needed for training and the predictive power of the resultant machine learning model 702.

The number of training passes indicates the number of training passes that the machine learning algorithm 704 makes over the training data set 706 during the training process. The number of training passes can be adjusted based, for example, on the size of the training data set 706, with larger training data sets being exposed to fewer training passes in consideration of time and/or resource utilization. The effectiveness of the resultant machine learning model 702 can be increased by multiple training passes.

Data shuffling is a training parameter designed to prevent the machine learning algorithm 704 from reaching false optimal weights due to the order in which data contained in the training data set 706 is processed. For example, data provided in rows and columns might be analyzed first row, second row, third row, etc., and thus an optimal weight might be obtained well before a full range of data has been considered. By data shuffling, the data contained in the training data set 706 can be analyzed more thoroughly and mitigate bias in the resultant machine learning model 702.

Regularization is a training parameter that helps to prevent the machine learning model 702 from memorizing training data from the training data set 706. In other words, the machine learning model 702 fits the training data set 706, but the predictive performance of the machine learning model 702 is not acceptable. Regularization helps the machine learning system 700 avoid this overfitting/memorization problem by adjusting extreme weight values of the features 708. For example, a feature that has a small weight value relative to the weight values of the other features in the training data set 706 can be adjusted to zero.

The machine learning system 700 can determine model accuracy after training by using one or more evaluation data sets 710 containing the same features 708' as the features 708 in the training data set 706. This also prevents the machine learning model 702 from simply memorizing the data contained in the training data set 706. The number of evaluation passes made by the machine learning system 700 can be regulated by a target model accuracy that, when reached, ends the evaluation process and the machine learning model 702 is considered ready for deployment.

After deployment, the machine learning model 702 can perform a prediction operation ("prediction") 714 with an input data set 712 having the same features 708" as the features 708 in the training data set 706 and the features 708' of the evaluation data set 710. The results of the prediction 714 are included in an output data set 716 consisting of predicted data. The machine learning model 702 can perform other operations, such as regression, classification, and others. As such, the example illustrated in FIG. 7 should not be construed as being limiting in any way.

Figure 8:
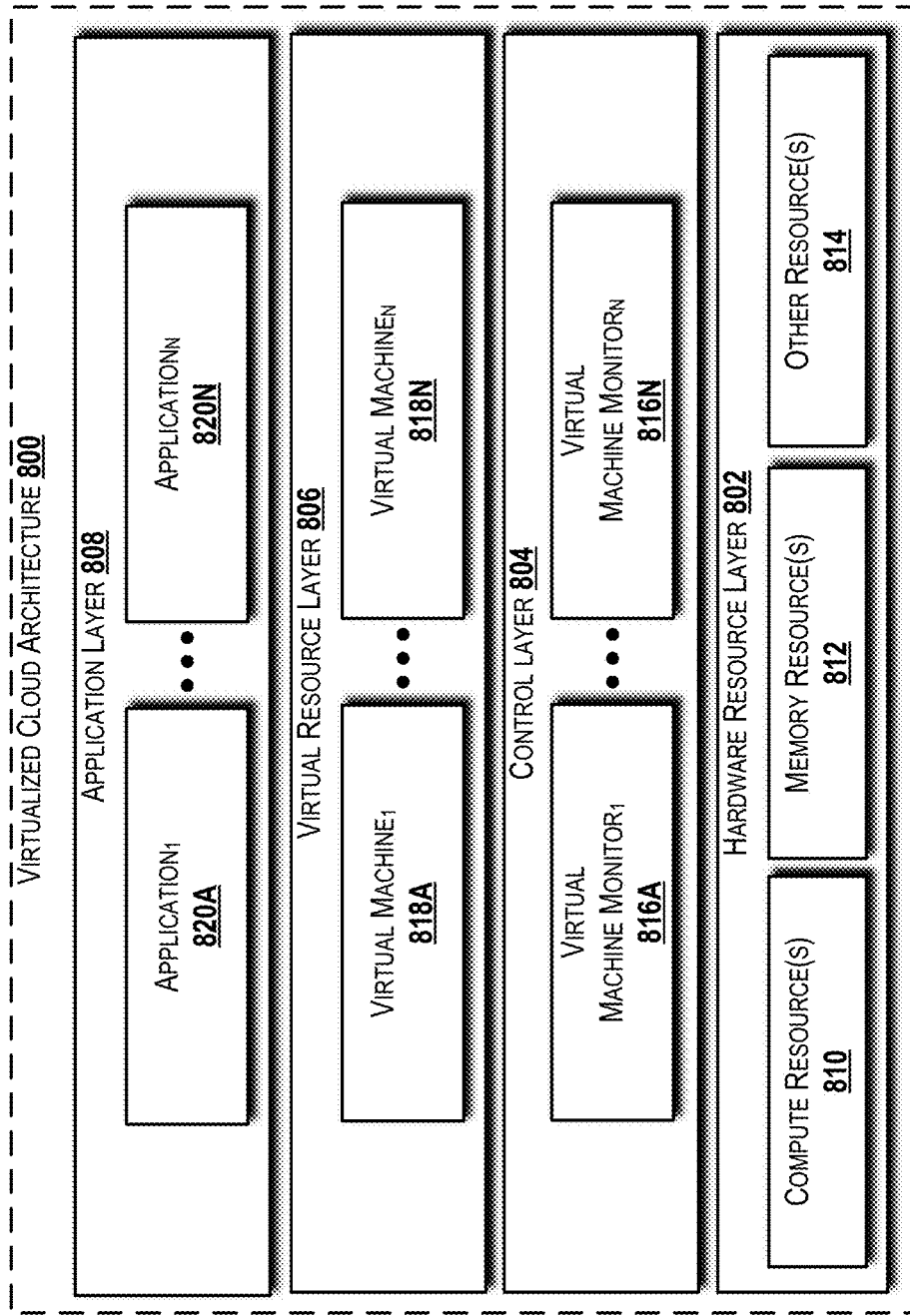
FIG. 8 is a block diagram illustrating an example virtualized cloud architecture and components thereof capable of implementing aspects of the embodiments presented herein.

Turning now to FIG. 8, a block diagram illustrating an example virtualized cloud architecture 800 and components thereof will be described, according to an exemplary embodiment. In some embodiments, the virtualized cloud architecture 800 can be utilized to implement one or more of the cloud networks 102. The virtualized cloud architecture 800 is a shared infrastructure that can support multiple services and network applications. The illustrated virtualized cloud architecture 800 includes a hardware resource layer 802, a control layer 804, a virtual resource layer 806, and an application layer 808 that work together to perform operations as will be described in detail herein.

The hardware resource layer 802 provides hardware resources, which, in the illustrated embodiment, include one or more compute resources 810, one or more memory resources 812, and one or more other resources 814. The compute resource(s) 810 can include one or more hardware components that perform computations to process data, and/or to execute computer-executable instructions of one or more application programs, operating systems, and/or other software. The compute resources 810 can include one or more central processing units ("CPUs") configured with one or more processing cores. The compute resources 810 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 810 can include one or more discrete GPUs. In some other embodiments, the compute resources 810 can include CPU and GPU components that are configured in accordance with a co-processing CPU/GPU computing model, wherein the sequential part of an application executes on the CPU and the computationally-intensive part is accelerated by the GPU. The compute resources 810 can include one or more system-on-chip ("SoC") components along with one or more other components, including, for example, one or more of the memory resources 812, and/or one or more of the other resources 814. In some embodiments, the compute resources 810 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 810 can be or can include one or more hardware components architected in accordance with an advanced reduced instruction set computing ("RISC") machine ("ARM") architecture, available for license from ARM HOLDINGS. Alternatively, the compute resources 810 can be or can include one or more hardware components architected in accordance with an x86 architecture, such an architecture available from INTEL CORPORATION of Mountain View, Calif., and others. Those skilled in the art will appreciate the implementation of the compute resources 810 can utilize various computation architectures, and as such, the compute resources 810 should not be construed as being limited to any particular computation architecture or combination of computation architectures, including those explicitly disclosed herein.

The memory resource(s) 812 can include one or more hardware components that perform storage operations, including temporary or permanent storage operations. In some embodiments, the memory resource(s) 812 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 810.

The other resource(s) 814 can include any other hardware resources that can be utilized by the compute resources(s) 810 and/or the memory resource(s) 812 to perform operations described herein. The other resource(s) 814 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 802 can be virtualized by one or more virtual machine monitors ("VMMs") 816A-816N (also known as "hypervisors"; hereinafter "VMMs 816") operating within the control layer 804 to manage one or more virtual resources that reside in the virtual resource layer 806. The VMMs 816 can be or can include software, firmware, and/or hardware that alone or in combination with other software, firmware, and/or hardware, manages one or more virtual resources operating within the virtual resource layer 806.

The virtual resources operating within the virtual resource layer 806 can include abstractions of at least a portion of the compute resources 810, the memory resources 812, the other resources 814, or any combination thereof. These abstractions are referred to herein as virtual machines ("VMs"). In the illustrated embodiment, the virtual resource layer 806 includes VMs 818A-818N (hereinafter "VMs 818"). Each of the VMs 818 can execute one or more applications 820A-820N in the application layer 808.

Figure 9:
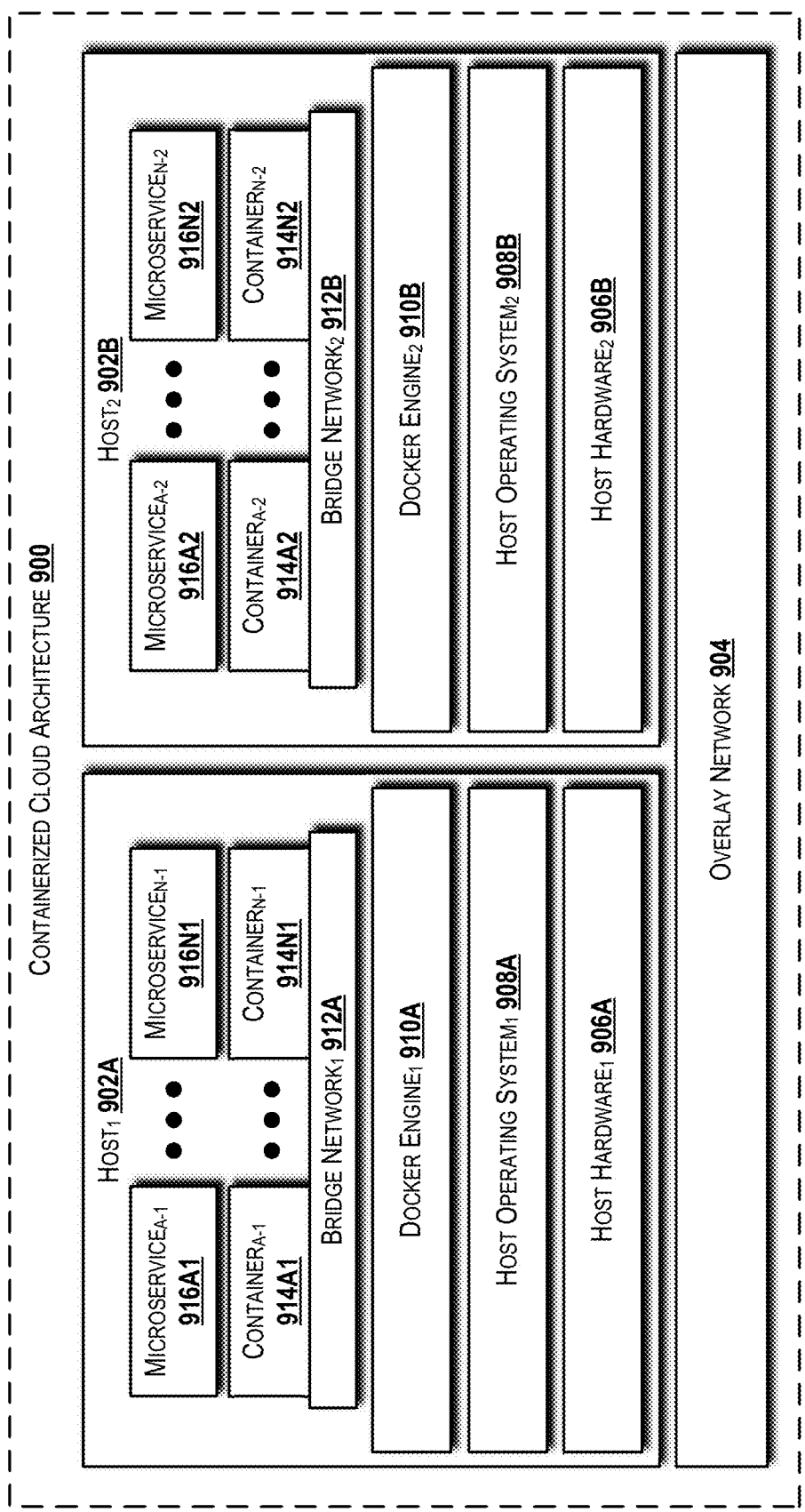
FIG. 9 is a block diagram illustrating an exemplary containerized cloud architecture capable of implementing, at least in part, aspects of the concepts and technologies disclosed herein, according to an illustrative embodiment.

Turning now to FIG. 9, a block diagram illustrating an exemplary containerized cloud architecture 900 capable of implementing, at least in part, aspects of the concepts and technologies disclosed herein will be described, according to an illustrative embodiment. In some embodiments, the containerized cloud architecture 900 can be utilized to implement one or more of the cloud networks 102. The illustrated containerized cloud architecture 900 includes a first host ("host") 902A and a second host ("host") 902B (at times referred to herein collectively as hosts 902 or individually as host 902) that can communicate via an overlay network 904. Although two hosts 902 are shown, the containerized cloud architecture 900 can support any number of hosts 902. The overlay network 904 can enable communication among hosts 902 in the same cloud network (as shown in FIG. 9) or hosts 902 across different cloud networks 102. Moreover, the overlay network 904 can enable communication among hosts 902 owned and/or operated by the same or different entities.

The illustrated host 902A includes a host hardware$_1$ 906A, a host operating system$_1$ 908A, a DOCKER engine$_1$ 910A, a bridge network$_1$ 912A, containers$_{A-1}$ through container$_{N-1}$ 914A1-914N1, and microservice$_{A-1}$ through microservice$_{N-1}$ 916A1-916N1. Similarly, the illustrated hosts 902B includes a host hardware$_2$ 906B, a host operating systems 908B, a DOCKER engines 910B, a bridge networks 912B, container$_{A-2}$ through container$_{N-2}$ 914A2-914N2, and microservice$_{A-2}$ through microservice$_{N-2}$ 916A2-916N2.

The host hardware$_1$ 906A and the host hardware$_2$ 906B (at times referred to herein collectively or individually as host hardware 906) can be implemented as bare metal hardware such as one or more physical servers. The host hardware 906 alternatively can be implemented using hardware virtualization. In some embodiments, the host hardware 906 can include compute resources, memory resources, and other hardware resources. These resources can be virtualized according to known virtualization techniques. A virtualization cloud architecture 800 is described above with reference to FIG. 8. Although the containerized cloud architecture 900 and the virtualization cloud architecture 800 are described separately, these architecture can be combined to provide a hybrid containerized/virtualized cloud architecture. Those skilled in the art will appreciate that the disclosed cloud architectures are simplified for ease of explanation and can be altered as needed for any given implementation without departing from the scope of the concepts and technologies disclosed herein. As such, the containerized cloud architecture 900 and the virtualized cloud architecture 800 should not be construed as being limiting in any way.

Compute resources can include one or more hardware components that perform computations to process data and/or to execute computer-executable instructions. For example, the compute resources can execute instructions of the host operating system$_1$ 908A and the host operating system$_2$ 908B (at times referred to herein collectively as host operating systems 908 or individually as host operating system 908), the containers 914A1-914N1 and the containers 914A2-914N2 (at times referred to herein collectively as containers 914 or individually as container 914), and the microservices 916A1-916N1 and the microservices 916A2-916N2 (at times referred to herein collectively as microservices 916 or individually as microservice 916).

The compute resources of the host hardware 906 can include one or more central processing units ("CPUs") configured with one or more processing cores. The compute resources can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources can include one or more discrete GPUs. In some other embodiments, the compute resources can include CPU and GPU components that are configured in accordance with a co-processing CPU/GPU computing model, wherein the sequential part of an application executes on the CPU and the computationally-intensive part is accelerated by the GPU. The compute resources can include one or more system-on-chip ("SoC") components along with one or more other components, including, for example, one or more memory resources, and/or one or more other resources. In some embodiments, the compute resources can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources can be or can include one or more hardware components architected in accordance with an advanced reduced instruction set computing ("RISC") ("ARM") architecture, available for license from ARM HOLDINGS. Alternatively, the compute resources can be or can include one or more hardware components architected in accordance with an x86 architecture, such an architecture available from INTEL CORPORATION, and others. Those skilled in the art will appreciate the implementation of the compute resources can utilize various computation architectures, and as such, the compute resources should not be construed as being limited to any particular computation architecture or combination of computation architectures, including those explicitly disclosed herein.

The memory resources of the host hardware 906 can include one or more hardware components that perform storage operations, including temporary or permanent storage operations. In some embodiments, the memory resource(s) include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources.

The other resource(s) of the host hardware 906 can include any other hardware resources that can be utilized by the compute resources(s) and/or the memory resource(s) to perform operations described herein. The other resource(s) can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The host operating systems 908 can be proprietary, open source, or closed source. In some embodiments, the host operating systems 908 can be or can include one or more container operating systems designed specifically to host containers such as the containers 914. For example, the host operating systems 908 can be or can include FEDORA COREOS (available from RED HAT, INC), RANCHEROS (available from RANCHER), and/or BOTTLEROCKET (available from Amazon Web Services). In some embodiments, the host operating systems 908 can be or can include one or more members of the WINDOWS family of operating systems from MICROSOFT CORPORATION (e.g., WINDOWS SERVER), the LINUX family of operating systems (e.g., CENTOS, DEBIAN, FEDORA, ORACLE LINUX, RHEL, SUSE, and UBUNTU), the SOLARIS family of operating systems from ORACLE CORPORATION, other operating systems, and the like.

The containerized cloud architecture 900 can be implemented utilizing any containerization technologies. Presently, open-source container technologies, such as those available from DOCKER, INC., are the most widely used, and it appears will continue to be for the foreseeable future. For this reason, the containerized cloud architecture 900 is described herein using DOCKER container technologies available from DOCKER, INC., such as the DOCKER engines 910. Those skilled in the art will appreciate that other container technologies may also be applicable to implementing the concepts and technologies disclosed herein, and as such, the containerized cloud architecture 900 is not limited to DOCKER container technologies. Moreover, although open-source container technologies are most widely used, the concepts and technologies disclosed here may be implemented using proprietary technologies or closed source technologies.

The DOCKER engines 910 are based on open source containerization technologies available from DOCKER, INC. The DOCKER engines 910 enable users (not shown) to build and containerize applications. The full breadth of functionality provided by the DOCKER engines 910 and associated components in the DOCKER architecture are beyond the scope of the present disclosure. As such, the primary functions of the DOCKER engines 910 will be described herein in brief, but this description should not be construed as limiting the functionality of the DOCKER engines 910 or any part of the associated DOCKER architecture. Instead, those skilled in the art will understand the implementation of the DOCKER engines 910 and other components of the DOCKER architecture to facilitate building and containerizing applications within the containerized cloud architecture 900.

The DOCKER engine 910 functions as a client-server application executed by the host operating system 908. The DOCKER engine 910 provides a server with a daemon process along with application programming interfaces ("APIs") that specify interfaces that applications can use to communicate with and instruct the daemon to perform operations. The DOCKER engine 910 also provides a command line interface ("CLI") that uses the APIs to control and interact with the daemon through scripting and/or CLI commands. The daemon can create and manage objects such as images, containers, networks, and volumes. Although a single DOCKER engine 910 is illustrated in each of the hosts 902, multiple DOCKER engines 910 are contemplated. The DOCKER engine(s) 910 can be run in swarm mode.

The bridge networks 912 enable the containers 914 connected to the same bridge network to communicate. For example, the bridge network$_1$ 912A enables communication among the containers 914A1-914N1, and the bridge network$_2$ 912B enables communication among the containers 914A2-914N2. In this manner, the bridge networks 912 isolate the containers 914A1-914N1 from the containers 914A2-914N2 to prevent direct communication. In some embodiments, the bridge networks 912 are software network bridges implemented via the DOCKER bridge driver. The DOCKER bridge driver enables default and user-defined network bridges.

The containers 914 are runtime instances of images. The containers 914 are described herein specifically as DOCKER containers, although other containerization technologies are contemplated as noted above. Each container 914 can include an image, an execution environment, and a standard set of instructions.

The microservices 916 are applications that provide a single function. In some embodiments, each of the microservices 916 is provided by one of the containers 914, although each of the containers 914 may contain multiple microservices 916. For example, the microservices 916 can include, but are not limited, to server, database, and other executable applications to be run in an execution environment provided by a container 914. The microservices 916 can provide any type of functionality, and therefore all the possible functions cannot be listed herein. Those skilled in the art will appreciate the use of the microservices 916 along with the containers 914 to improve many aspects of the containerized cloud architecture 900, such as reliability, security, agility, and efficiency, for example.

Based on the foregoing, it should be appreciated that concepts and technologies for role-based access control with complete set of granular roles have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

The invention claimed is:

1. A method comprising:
    marking, by a role-based access control system comprising a processor, all granular roles in a granular role group as non-tested to create a non-tested granular role set, wherein each granular role in the non-tested granular role set has not been tested for inclusion in a complete granular role set;
    randomly selecting, by the role-based access control system, a granular role from the non-tested granular role set;
    assigning, by the role-based access control system, both the non-tested granular role set and a tested-keep granular role set to the granular role group, wherein each granular role in the tested-keep granular role set has been tested and approved for inclusion in the complete granular role set;
    determining, by the role-based access control system, whether a user assigned to the granular role group has access to a protected function; and
    in response to determining that the user does not have access to the protected function, marking the granular role for inclusion in the tested-keep granular role set.

2. The method of claim 1, further comprising in response to determining that the user does have access to the protected function, marking the granular role for inclusion in a tested-removed granular role set, wherein each granular role in the tested-removed granular role set has been tested and denied for inclusion in the complete granular role set.

3. The method of claim 2, further comprising:
    determining, by the role-based access control system, whether the non-tested granular role set comprises at least one additional granular role;
    in response to determining that the non-tested granular role set comprises the at least one additional granular role, randomly selecting, by the role-based access control system, a further granular role from the non-tested granular role set;
    assigning, by the role-based access control system, both the non-tested granular role set and the tested-keep granular role set to the granular role group;
    determining, by the role-based access control system, whether the user assigned to the granular role group has access to the protected function;
    in response to determining that the user does not have access to the protected function, marking the further granular role for inclusion in the tested-keep granular role set; and
    in response to determining that the user does have access to the protected function, marking the further granular role for inclusion in the tested-removed granular role set.

4. The method of claim 3, further comprising:
    determining, by the role-based access control system, whether the non-tested granular role set comprises the at least one additional granular role; and
    in response to determining that the non-tested granular role set does not include any additional granular roles, outputting, by the role-based access control system, the complete granular role set comprising the tested-keep granular role set.

5. The method of claim 4, wherein the protected function comprises a cloud function provided by a cloud network.

6. The method of claim 5, wherein the cloud network comprises a plurality of cloud resources.

7. The method of claim 6, wherein the cloud function comprises a create function, a delete function, an update function, or a view function for interacting with at least a portion of the plurality of cloud resources.

8. A role-based access control system comprising:
a processor; and
memory comprising computer-executable instructions that, when executed by the processor, causes the processor to perform operations comprising
marking all granular roles in a granular role group as non-tested to create a non-tested granular role set, wherein each granular role in the non-tested granular role set has not been tested for inclusion in a complete granular role set,
randomly selecting a granular role from the non-tested granular role set,
assigning both the non-tested granular role set and a tested-keep granular role set to the granular role group, wherein each granular role in the tested-keep granular role set has been tested and approved for inclusion in the complete granular role set,
determining whether a user assigned to the granular role group has access to a protected function, and
in response to determining that the user does not have access to the protected function, marking the granular role for inclusion in the tested-keep granular role set.

9. The role-based access control system of claim 8, wherein the operations further comprise, in response to determining that the user does have access to the protected function, marking the granular role for inclusion in a tested-removed granular role set, wherein each granular role in the tested-removed granular role set has been tested and denied for inclusion in the complete granular role set.

10. The role-based access control system of claim 9, wherein the operations further comprise:
determining whether the non-tested granular role set comprises at least one additional granular role;
in response to determining that the non-tested granular role set comprises the at least one additional granular role, randomly selecting a further granular role from the non-tested granular role set;
assigning both the non-tested granular role set and the tested-keep granular role set to the granular role group;
determining whether the user assigned to the granular role group has access to the protected function;
in response to determining that the user does not have access to the protected function, marking the further granular role for inclusion in the tested-keep granular role set; and
in response to determining that the user does have access to the protected function, marking the further granular role for inclusion in the tested-removed granular role set.

11. The role-based access control system of claim 10, wherein the operations further comprise:
determining whether the non-tested granular role set comprises the at least one additional granular role; and
in response to determining that the non-tested granular role set does not include any additional granular roles, outputting the complete granular role set comprising the tested-keep granular role set.

12. The role-based access control system of claim 11, wherein the protected function comprises a cloud function provided by a cloud network.

13. The role-based access control system of claim 12, wherein the cloud network comprises a plurality of cloud resources.

14. The role-based access control system of claim 12, wherein the cloud function comprises a create function, a delete function, an update function, or a view function for interacting with at least a portion of the plurality of cloud resources.

15. A computer-readable storage medium comprising computer-executable instructions that, when executed by a processor, cause the processor to perform operations comprising:
marking all granular roles in a granular role group as non-tested to create a non-tested granular role set, wherein each granular role in the non-tested granular role set has not been tested for inclusion in a complete granular role set;
randomly selecting a granular role from the non-tested granular role set;
assigning both the non-tested granular role set and a tested-keep granular role set to the granular role group, wherein each granular role in the tested-keep granular role set has been tested and approved for inclusion in the complete granular role set;
determining whether a user assigned to the granular role group has access to a protected function; and
in response to determining that the user does not have access to the protected function, marking the granular role for inclusion in the tested-keep granular role set.

16. The computer-readable storage medium of claim 15, wherein the operations further comprise, in response to determining that the user does have access to the protected function, marking the granular role for inclusion in a tested-removed granular role set, wherein each granular role in the tested-removed granular role set has been tested and denied for inclusion in the complete granular role set.

17. The computer-readable storage medium of claim 16, wherein the operations further comprise:
determining whether the non-tested granular role set comprises at least one additional granular role;
in response to determining that the non-tested granular role set comprises the at least one additional granular role, randomly selecting a further granular role from the non-tested granular role set;
assigning both the non-tested granular role set and the tested-keep granular role set to the granular role group;
determining whether the user assigned to the granular role group has access to the protected function;
in response to determining that the user does not have access to the protected function, marking the further granular role for inclusion in the tested-keep granular role set; and
in response to determining that the user does have access to the protected function, marking the further granular role for inclusion in the tested-removed granular role set.

18. The computer-readable storage medium of claim 17, wherein the operations further comprise:
determining whether the non-tested granular role set comprises the at least one additional granular role; and
in response to determining that the non-tested granular role set does not include any additional granular roles, outputting the complete granular role set comprising the tested-keep granular role set.

19. The computer-readable storage medium of claim 18, wherein the protected function comprises a cloud function provided by a cloud network; and wherein the cloud network comprises a plurality of cloud resources.

20. The computer-readable storage medium of claim 19, wherein the cloud function comprises a create function, a delete function, an update function, or a view function for interacting with at least a portion of the plurality of cloud resources.

\* \* \* \* \*